MOTOR CONTROL FOR SYNCHRONIZING WEB FEED

Filed Aug. 30, 1952 2 Sheets-Sheet 1

INVENTOR.

DALLAS R. ANDREWS

BY Morris Rabkin

ATTORNEY

Aug. 21, 1956 D. R. ANDREWS 2,760,137

MOTOR CONTROL FOR SYNCHRONIZING WEB FEED

Filed Aug. 30, 1952 2 Sheets-Sheet 2

INVENTOR.

DALLAS R. ANDREWS

BY Morris A. Rabkin

ATTORNEY 2,760,137

MOTOR CONTROL FOR SYNCHRONIZING WEB FEED

Dallas R. Andrews, Collingswood, N. J., assignor to Radio Corporation of America, a corporation of Delaware Application August 30, 1952, Serial No. 307,205

12 Claims. (Cl. 318—437)

This invention relates to control circuits for web driving means, and more particularly to means for bringing one driven web into initial synchronism with another driven web.

Various means have been proposed to maintain synchronism between two driven webs such as a motion picture film and a magnetic record tape bearing a sound track corresponding to picture record on the film. One such system is disclosed and claimed in applicant's copending application Ser. No. 165,274, filed May 31, 1950, now U. S. Patent No. 2,627,596. In that case, means are provided for maintaining synchronism between a magnetic record tape and a frequency standard. According to that invention, synchronizing marks are placed on the back of the tape. The marks are moved past a detecting means where they are converted into electrical signals. The signals are amplified and compared with signals from the frequency standard in a frequency difference detector or comparer. The frequency difference detector then controls a variable frequency oscillator the output of which is used to energize the tape drive motor.

In such a system, the frequency standard may be the line current frequency, or may be obtained directly from a film projector. It may be seen that such a system will maintain synchronism between two webs so far as effective linear velocity is concerned. However, when sound and pictures are to be synchronized, mere coincidence of linear velocity is not sufficient. The two webs must be brought into initial synchronism or, as it is sometimes known, lip-synchronism. That is, the sound track signal must coincide with the corresponding portions of the picture film so that, for example, a spoken word signal will coincide with the movement of the lips of the speaker.

It is, accordingly an object of this invention to provide novel means for establishing initial synchronism between two driven web members.

It is another object of this invention to provide an improved coincidence detecting means coupled to means for applying an incremental correction to compensate for a lack of coincidence.

In accomplishing these and other objects, there has been provided, in accordance with the present invention, a reeling system for each of two web members, coincidence indicating means on each of the webs, means for detecting the occurrence of each of the indicating means and means responsive to the detecting means to provide a correction in one of the reeling systems when there is a lack of coincident occurrence of the indicating means.

A better understanding of the invention may be had from the following detailed description when read in connection with the accompanying drawings, wherein—

Figure 1:
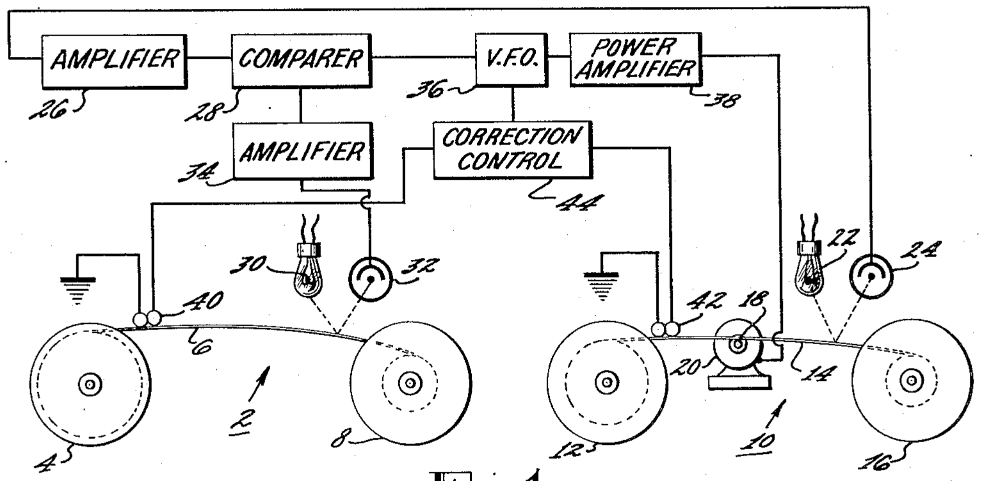
Figure 3:
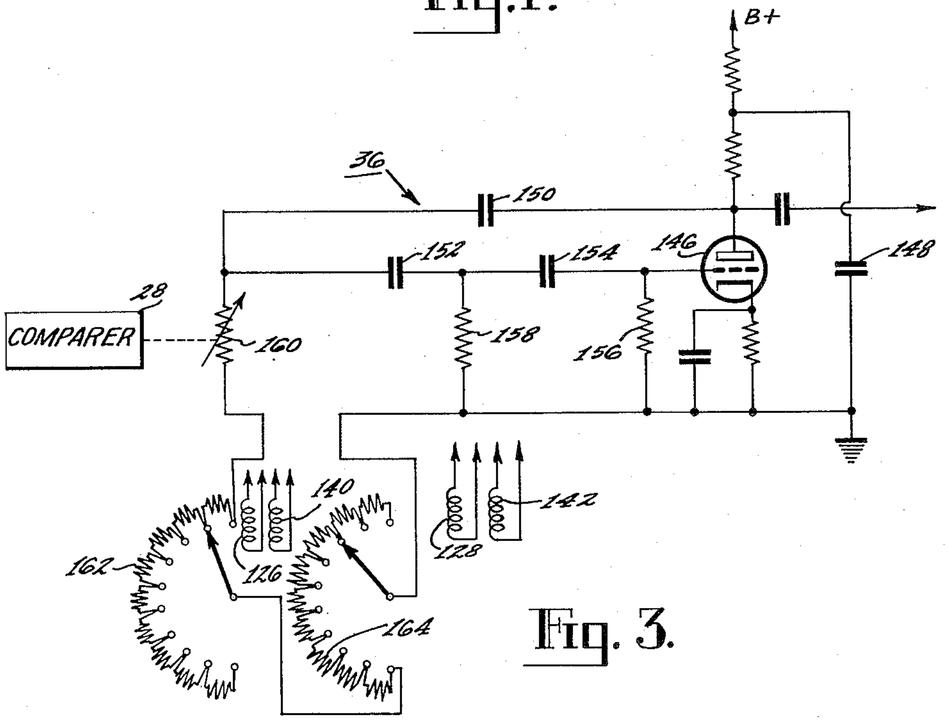
Figure 4:
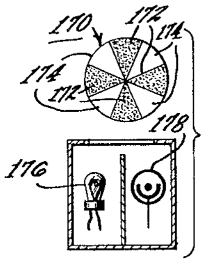
Figure 2:
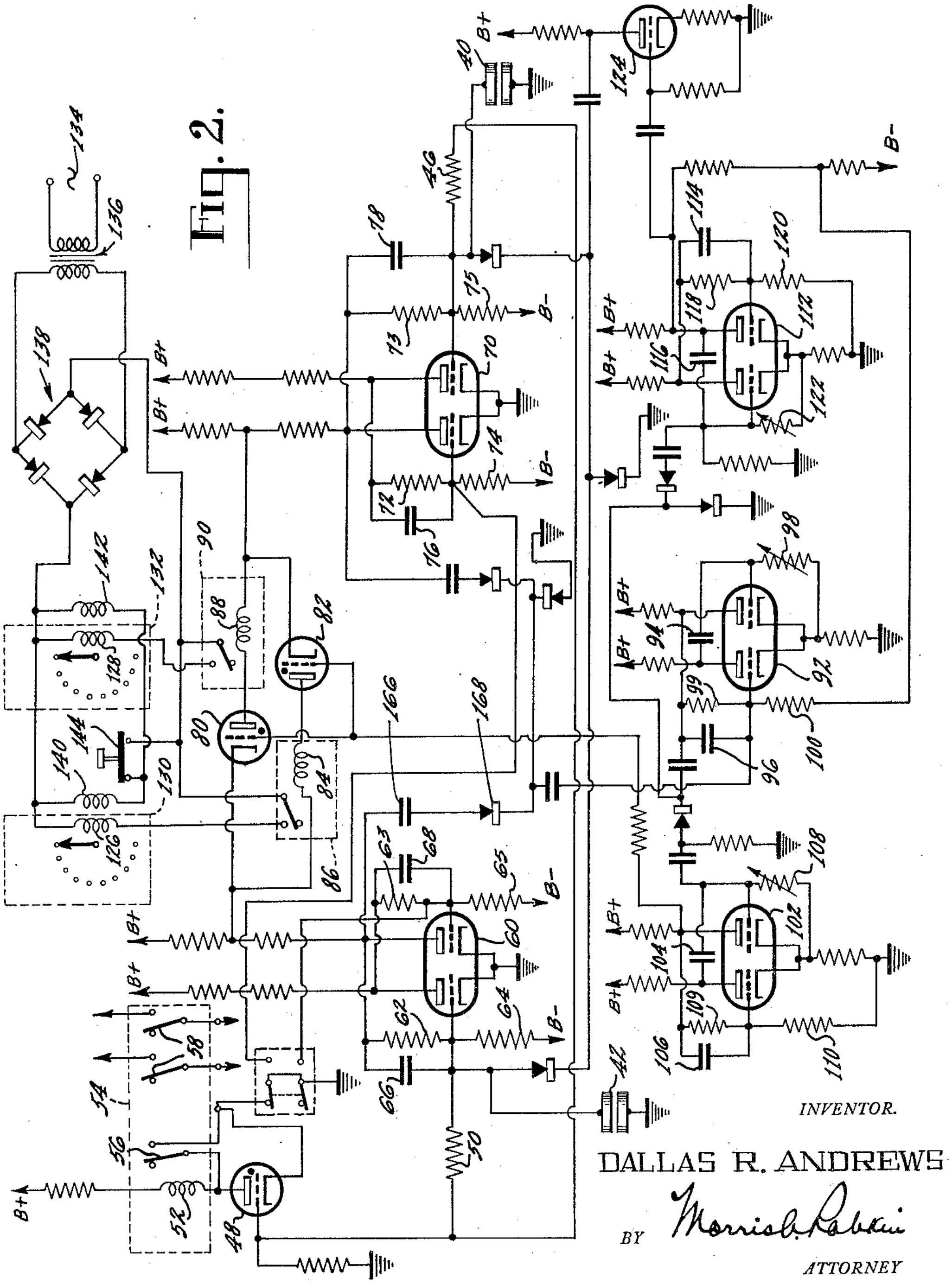

Fig. 1 is a schematic representation of a system arranged in accordance with the present invention, Fig. 2 is a schematic diagram of a coincidence detecting and correcting circuit according to this invention, Fig. 3 is a schematic representation of one circuit arrangement for introducing correction into one of the reeling systems to correct for lack of coincidence, and Fig. 4 is a view showing an alternative means of obtaining a series of synchronizing signals.

Referring to the drawings in more detail, in Fig. 1 there is shown a film reeling system 2 including a supply reel 4, a film 6, and a take-up reel 8. Suitable means are provided for driving the film. However, since they are well known and not essential to an understanding of this invention, they are not shown. A second reeling system 10 includes a supply reel 12, a magnetic record tape 14, and a take-up reel 16. A capstan 18, driven by a synchronous motor 20, is positioned to drive the tape.

As is described and claimed in the aforesaid copending application, the tape bears markers which are in contrasting colors on the base side thereof. A beam of light from source 22 is focused on the tape and reflected to a photocell 24, the light falling on the photocell will, of course, be modulated by the passing of the markers on the tape. Thus, there will be produced a fluctuating signal corresponding in frequency to the passage of the markers past the point where the light is focussed on the tape. The signals are conducted to an amplifier 26. The amplified signals are applied to a comparer 28 wherein the frequency of the signals is compared with the frequency of a selected standard.

Since it is desirable in the instant case to synchronize the motion of the tape with that of the picture bearing film, a frequency standard may be obtained directly from a reeling system of the film. For example, since the picture bearing the film is usually of the type having sprocket holes perforated along at least one edge thereof, a light beam from a source 30 may be focussed to fall upon the film and the area of the sprocket holes and reflected by the film to a photocell 32 producing a signal corresponding in frequency to a passage of the sprocket holes past the point upon which the light beam is focussed. The signals are fed to an amplifier 34 and thence applied to the comparer. A variable frequency oscillator 36 is connected through a power amplifier 38 to energize the motor 20 which, in turn, drives the tape. Since the motor is a synchronous motor, its speed will be controlled by the frequency of the oscillator. The normal frequency of the oscillator is such that it will ordinarily drive the tape 14 at the desired speed. However, since the tape is subject to variations in its length due to stretching or changes in atmospheric conditions, its linear speed must vary accordingly. Hence, the oscillator is variable in either direction from its normal operating frequency.

The comparer 28 is coupled to the oscillator 36 in such a way that the frequency of the oscillations will be varied in accordance with the difference in speed of the two webs.

In order to assure that the two films will be brought into initial synchronism, a second type of marking device is applied to the film and to the tape. This may be in the form of small pieces of metallic foil secured to the surface of the tape. It is, of course, desirable that both the film and the tape be provided with leaders of sufficient length that the two webs will be fully synchronized before the program part of the records are reached. Suitable detecting means is provided for the detecting of the markers of the second type, or coincidence markers. For example, if the markers are foil members secured to the film, a suitable detector might be a pair of spaced insulating film contact members 40. A similar pair of contact members 42 are positioned adjacent the tape path. These contactors are connected to a correction control circuit 44 which detects whether or not the markers of the second type pass the contact members simultaneously and if one occurs first a circuit applies an incremental correction in the appropriate direction to bring the markers into coincidence. This correction control circuit may apply its correction directly to the variable frequency oscillator where it would have the effect of increasing or decreasing the frequency of the signal generated by the oscillator and hence increasing or decreasing the linear speed of the tape as the case may be.

A better understanding of the correction control circuit may be had from the consideration of Fig. 2 of the drawing. In that figure, a film contact member 40 is connected through a resistor 46 to the control grid of a thyratron 48. Similarly the tape contact member 42 is connected to the same control grid of the thyratron 48 through a resistor 50. The plate circuit of the thyratron includes a coil 52 of a relay 54. The thyratron 48 is normally biased to cut off. However, when one of the foil coincidence markers passes either the film contact members or the tape contact members, the thyratron fires, energizing the coils of the relay. When the relay picks up, a first make-break contact 56 of the relay 54 short circuits the thyratron 48 extinguishing it and at the same time by-passing the thyratron leaving the relay coil energized. A second and third pair of contacts 58 are connected in circuit with the comparer, deactivating the comparer until such time as one of the foil markers has passed the tape or film contact member. It is assumed that, by the time the first marker will have passed the contact member, both the film and the tape would be up to normal operating speed.

The tape contact member 42 is also connected to a first flip-flop circuit comprising a tube 60 having a first cathode, control grid and anode, and a second cathode, control grid and anode; resistors 62, 63, 64 and 65; and capacitors 66 and 68. Similarly, the film contact member 40 is connected to a second flip-flop circuit comprising a tube 70 which has a first cathode, control grid and anode and, a second cathode, control grid and anode; resistors 72, 73, 74 and 75; and capacitors 76 and 78. In the output plate circuit of the first flip-flop, there is connected the cathode of a thyratron gate 80 and the anode of another thyratron gate 82. In the anode circuit of the thyratron 82 is the coil 84 of a relay 86. In the output plate circuit of the second flip-flop, there is connected the cathode of the thyratron 82 and the anode of the thyratron 80. In the anode circuit of the thyratron 80, there is connected the coil 88 of a relay 90.

A first monostable multi-vibrator includes a tube 92 having a first cathode, control grid and anode, and a second cathode, control grid and anode; capacitors 94 and 96, and resistors 98, 99 and 100. This monostable multi-vibrator is connected to the plate output circuit of each of the aforementioned flip-flops and exhibits a relatively short time delay between the time it is triggered until the time it returns to its stable condition. A second monostable multi-vibrator is connected in the output plate circuit of the first monostable multi-vibrator. The second monostable multi-vibrator includes a tube 102 having a first cathode, control grid, and anode, and a second cathode, control grid, and anode; capacitors 104 and 106; and resistors 108, 109 and 110.

Also in the output plate circuit of the first monostable multi-vibrator is a third monostable multi-vibrator. The third monostable multi-vibrator includes a tube 112 having a first cathode, control grid, and anode, and a second cathode, control grid and anode; capacitors 114 and 116; and resistors 118, 120 and 122.

In the output plate circuit of the second monostable multi-vibrator are the control grids of the thyratrons 80 and 82.

The third monostable multi-vibrator, which has a relatively long time delay as compared to that of the first monostable multi-vibrator, has its output plate circuit connected in feedback relation to the input circuit of the first monostable multi-vibrator. Also in the output plate circuit of the third monostable multi-vibrator is an isolating amplifier including a tube 124. The output circuit of the tube 124 is connected to the input circuits of the tubes 60 and 70.

The relays 86 and 90, in the plate circuits of the thyratrons 80 and 82, respectively control, for example, the coils 126 and 128 of a pair of stepping relays 130 and 132. The coils 126 and 128 may be energized from an appropriate source of electrical energy 134 connected through a transformer 136 and a rectifier 138 to the coils. The stepping relays may also be provided with suitable reset coils 140 and 142 which may be controlled by a reset switch 144.

As shown in Fig. 3, the stepping relays are arranged to add or subtract resistance in the input circuit of the variable frequency oscillator 36. The oscillator, as shown, includes a tube 146, capacitors 148, 150, 152, 154, resistors 156, 158, and 160, and the resistors 162, 164 under the control of the stepping relays. The resistor 160 is a variable resistor and is variable under the control of the comparer 28.

In operation, the film and the tape are threaded into their respective reeling systems. Let us assume that when the film and the tape are so threaded the corresponding markers on the two members will not be displaced more than a distance equal to the length of, say, ten frames of the picture film. Then successive coincidence markers on each of the web members may be placed at about ten frame intervals. The two reeling systems are started. At this point the comparer is de-energized since the relay 54 has not been energized. By the time the first of the foil coincidence markers, whether it be on the tape or on the film, has reached its contact member the two reeling systems will have achieved full operating speed. When the first of the foil markers engages its contact, the thyratron 48 is turned on which energizes the coil 52 of the relay 54. When the relay 54 picks up, the first contact by-passes the thyratron 48, extinguishes it and at the same time provides a completed circuit for the relay coil, locking the relay in picked-up condition. The second and third contacts 58 of the relay 54 complete a circuit to the comparer, energizing the same.

Further assume, for the purpose of illustration, that the first marker to reach one of the contact members is one which is on the sound tape. This will apply a relatively positive pulse to the input control grid of the tube 60 of the first flip-flop circuit. The left hand portion of the tube 60 is normally biased to cut-off while the other side is conductive. The application of the positive pulse keys the circuit so that the left hand portion now becomes conductive, cutting off the right hand portion. When the right hand portion is cut off, the potential on the cathode of the thyratron 80 and the anode of the thyratron 82 is raised, leaving the thyratron 82 in condition to fire if a pulse is applied to its control grid, while the thyratron 80 is rendered incapable of firing by the relatively elevated potential on its cathode. When the right hand member of the first flip-flop is extinguished and the plate potential thereby raised, a positive pulse is first differentiated by a capacitor 166, and then rectified by a diode 168. The rectified positive pulse is applied to the control grid of the first monostable multi-vibrator, the left hand portion of which is normally cut off and the right hand portion normally conductive. The application of the pulse to the control grid of the left hand portion renders that portion conductive, extinguishing the right hand portion. The time constant of the circuit including the capacitor 94 and the resistor 98 is adjusted so that the multi-vibrator will remain in this triggered condition for a time substantially equal to the passage of one frame of the picture film past a reference point, after which time the multi-vibrator returns to its stable state. The return of the multi-vibrator to its stable state produces a negative pulse in the plate output circuit of the right hand portion. This negative pulse is applied to the control grid of the second monostable multi-vibrator, extinguishing the normally conductive right hand portion of the tube 102.

When the right hand portion is thus extinguished, a positive pulse is produced in its plate output circuit. This positive pulse is applied to the control grid of both of the thyratrons 80 and 82.

Assuming that the thyratron 82 was conditioned to fire by the application by the first flip-flop of the elevated potential to its anode, the tube will now be keyed into a conducting state, energizing the coil 126 of the relay in its anode circuit. Thus, the stepping relay 130 will be energized, increasing the resistance in the oscillator circuit, thereby decreasing the frequency of the oscillations and momentarily reducing the speed of the tape driving motor. However, the comparer by this time has taken control of the oscillator and will bring about a change in the value of the resistor 160 to restore the frequency output of the oscillator to the frequency to which the tape and film will be driven at corresponding linear speeds. However, time is consumed in the operation of the comparer in restoring the oscillator to its proper frequency and this time consumed is the measure of the increment of correction that is inserted into the reeling system. If the first marker sensed had been on the film instead of on the tape, the procedure would have been the same with the exception that the second flip-flop would have been triggered and the stepping relay 132 would have been energized to reduce the resistance in the oscillator circuit, increasing its frequency.

Returning to the first monostable multi-vibrator, at the same time the negative pulse was applied to the second monostable multi-vibrator, a negative pulse was also applied to the control grid of the third monstable multi-vibrator. In this third monostable multi-vibrator, the left hand portion of the tube 112 is normally conducting. The negative pulse cuts off the left hand portion rendering the right hand portion, conductive. The time constant of the circuit of this third multi-vibrator is such that the multi-vibrator will remain in its unstable state for a time substantially equal to the passage of nine frames on the picture film past a reference point. While the third multi-vibrator is in its unstable condition, a feedback circuit from the plate of the right hand portion is connected to the input control grid of the left hand portion of the first monostable multi-vibrator, biasing that grid heavily negative.

It will be remembered that, in the discussion of the first multi-vibrator, it was explained that the multi-vibrator was adjusted to have a time delay of substantially one film frame. With this arrangement, if the marker on the sound tape was only slightly ahead of the marker on the picture film, that is, say, within one film frame distance, that is as close a synchronism as would be deemed desirable. Therefore, if the correction were to be inserted under such conditions the two reeling systems would actually be driven further out of synchronism than they were initially. Hence, with this slight delay, if the film contact occurred within the period of the delay, the second flip-flop circuit would be triggered and the elevated potential would be applied to the anode of the thyratron 80 and the cathode of the thyratron 82, thus rendering both tubes incapable of firing. The result would be that the positive pulse applied to the control grids of the thyratrons from the second monostable multi-vibrator would not cause either of the two thyratrons to fire, and hence no correction would be inserted in the reeling system.

If on the other hand, the second marker, that is, in our illustrative example, the one on the film, occurs substantially after the passage of the first, say, five frames later, were it not for the bias applied to the first monostable multi-vibrator from the third monostable multi-vibrator whereby the first monostable multi-vibrator is locked up, the first monostable multi-vibrator would again be triggered and a correction inserted in the direction opposite to that of the first correction. Such a situation would result in a nullification of the first correction inserted.

Therefore, since the successive markers on both the film and the tape are spaced approximately ten frames apart, respectively, the nine frame delay inserted by the third monostable multi-vibrator assures that the first monostable multi-vibrator will not be triggered again until a second round of coincidence marker is sensed by the tape contact member.

Further, when the third monostable multi-vibrator returns to its stable state, a positive pulse is produced in its plate output circuit. This positive pulse is inverted and amplified by the isolating amplifier 124. The negative pulse output of this amplifier is applied to the input control grids of the tubes 60 and 70, resetting the flip-flops.

In the earlier mentioned copending application, the system for maintaining synchronization includes a photocell for sensing spaced markers on the back of the sound tape. The frequency of the signals produced as a result of the sensing of these marks was compared with a frequency standard which may be the line frequency of the energizing current. Since, in usual practice, motion picture film is positively driven by a synchronous motor, the frequency of the sensing may still be compared with the line frequency. However, it may be desirable to provide other means for obtaining a frequency standard. An example of one such means would be a photocell arrangement for sensing the passage of film sprocket holes past a reference point. Another arrangement might include a system such as that shown in Fig. 4 of the drawings wherein some rotating member 170 of the film reeling system is provided with alternate portions 172, 174 of contrasting color. This rotating member 170 may be one of the film driving sprockets and the system would include a source of light 176 and a photocell 178 arranged to sense alternations of the marks on the sprockets.

Thus, it may be seen that there has been provided an improved means for establishing initial or lip synchronization between a perforated film and a separately driven non-perforated tape member. Although the system has been described as related to the synchronization of a sound film to a picture film, it will be readily appreciated that it is within the scope of the invention to synchronize the motion of other types of webs.

What is claimed is:

1. In apparatus for reeling two web members in synchronism with each other wherein each of said members has coincidence indicating means thereon, the combination comprising a reeling system for each of said web members, means associated with each of said reeling systems for detecting the occurrence of each of said indicating means, a first flip-flop connected to be triggered by one of said detecting means, a second flip-flop connected to be triggered by the other of said detecting means, gate means connected to be conditioned by said flip-flops, means responsive to the first occurrence triggering of either of said flip-flops for developing a keying pulse, and means for applying said keying pulse to key said gate means whereby said gate means may pass a correction control signal whenever there is a substantial lack of coincidence of the occurrence of said indicating means on said web members.

2. In apparatus for reeling two web members in synchronism with each other wherein each of said web members has coincidence indicating means thereon, the combination comprising a reeling system for each of said web members, means associated with each of said reeling systems for detecting the occurrence of each of said indicating means, a first flip-flop connected to be triggered by signals from one of said detecting means, a second flip-flop connected to be triggered by signals from the other of said detecting means, gate means connected to be conditioned by said flip-flops, means responsive to the first occurring triggering of either of said flip-flops for developing a keying pulse for said gate means, means for applying said keying pulse to said gate means whereby said gate means may pass a correction control signal whenever there is a substantial lack of coincidence in the occurrence of said indicating means, and means responsive to said correction control signal to insert an incremental coincidence correction into one of said reeling systems.

3. The invention as set forth in claim 2 wherein the reeling system into which said incremental correction is inserted is driven by a motor and said means responsive to said correction control signal includes means for momentarily varying the speed of said motor in a direction to establish coincidence of said web members.

4. The invention as set forth in claim 2 characterized by the addition of means for effecting a delay between the time of triggering one of said flip-flops and the development of said keying pulse, and means responsive to the triggering of the other of said flip-flops for blocking said gate before the application of said keying pulse thereto in the event said other flip-flop is triggered during the interval of said delay whereby a slight deviation from coincidence will not cause a correction control signal to be passed by said gate.

5. The invention as set forth in claim 2 wherein one of said web members is a perforated motion picture film and the other of said web members is a non-perforated magnetic record tape.

6. In apparatus for reeling two web members in synchronism with each other wherein each of said web members has coincidence indicating means thereon, the combination comprising a reeling system for each of said web members, means associated with each of said reeling systems for detecting the occurrence of each of said indicating means, a first flip-flop connected to be triggered by one of said detecting means, a second flip-flop connected to be triggered by the other of said detecting means, gate means connected to be conditioned by said flip-flops, means responsive to either of said flip-flops for developing a keying pulse, means to apply said pulse to key said gate means thereby to produce a correction control signal indicative of any substantial lack of coincidence of the occurrence of said coincidence indicating means, and means responsive to the triggering of one of said flip-flops for blocking for a predetermined time interval the development of a second keying pulse by the triggering of the other of said flip-flops.

7. The invention as set forth in claim 6 characterized by the addition of means responsive to the operation of said blocking means to produce a reset triggering pulse upon the expiration of said predetermined time interval, and means for applying said reset triggering pulse to reset said flip-flops.

8. In apparatus for reeling two web members in synchronism with each other wherein each of said web members has coincidence indicating means thereon, the combination comprising a reeling system for each of said web members, means associated with each of said reeling systems for detecting the occurrence of each of said coincidence indicating means, and means responsive to said detecting means for providing an incremental correction in one of said reeling systems whereby said web members may be brought into an initial synchronism with respect to each other.

9. A coincidence detecting and correcting circuit comprising, in combination, at least two sources of signals, a first flip-flop responsive to one of said sources of signals, a second flip-flop responsive to another of said sources of signals, gate means connected to be conditioned for selective conduction by said flip-flops, means responsive to the first actuated of either of said flip-flops for developing a keying pulse, and means for applying said keying pulse to key said gate means whereby said gate means may pass a correction control signal whenever said flip-flops are triggered substantially out of coincidence.

10. A coincidence detecting and correcting circuit comprising, in combination, at least two sources of signals, a first flip-flop responsive to one of said sources of signals, a second flip-flop responsive to another of said sources of signals, and gate means connected to be conditioned for selective conduction by said flip-flops, means responsive to the first actuated of either of said flip-flops for developing a delayed keying pulse, and means for applying said pulse to key said gate means whereby said gate means may pass a signal indicative of a substantial lack of coincidence of the triggering of said flip-flops.

11. A coincidence detecting and correcting circuit comprising, in combination, at least two sources of signals having a period of recurrence, a first flip-flop responsive to one of said sources of signals, a second flip-flop responsive to another of said sources of signals, and gate means connected to be conditioned for selective conduction by said flip-flops, means responsive to the first actuated of either of said flip-flops for developing a delayed keying pulse, means for applying said pulse to key said gate whereby said gate means may pass a signal indicative of a substantial lack of coincidence of the triggering of said flip-flops, and means responsive to said first actuated of either of said flip-flops for developing a reset trigger pulse, said reset pulse being delayed an amount less than the amount of the period of recurrence of the signals from said sources, and being applied to reset said flip-flops.

12. In apparatus for moving two members in synchronism with each other wherein each of said members has coincidence indicating means thereon, the combination comprising a first and second system operative to effect movement of said members respectively, means associated with each of said systems for detecting the occurrence of each of said coincidence indicating means, and means responsive to said detecting means for providing an incremental correction in one of said systems whereby said members may be brought into an initial synchronism with respect to each other.

References Cited in the file of this patent

UNITED STATES PATENTS

| | | |
|---|---|---|
| 2,151,570 | Shoults et al. | Mar. 21, 1939 |
| 2,289,737 | Sorkin | July 14, 1942 |
| 2,429,500 | Wolfner | Oct. 21, 1947 |
| 2,536,153 | Bishop | Jan. 2, 1951 |
| 2,538,027 | Mozley et al. | Jan. 16, 1951 |
| 2,569,228 | Clark et al. | Sept. 25, 1951 |
| 2,591,247 | Farnsworth | Apr. 1, 1952 |
| 2,676,249 | Crosman | Apr. 20, 1954 |